(12) United States Patent
Powers

(10) Patent No.: US 6,935,276 B2
(45) Date of Patent: Aug. 30, 2005

(54) APPARATUS, A SYSTEM AND A METHOD FOR SUPPORTING AN ANIMAL DURING GROOMING

(76) Inventor: Susan Powers, 32D Ione Dr., South Elgin, IL (US) 60177-2960

(*) Notice: Subject to any disclaimer, the term of this patent is extended or adjusted under 35 U.S.C. 154(b) by 0 days.

(21) Appl. No.: 10/741,246

(22) Filed: Dec. 19, 2003

(65) Prior Publication Data

US 2005/0132979 A1 Jun. 23, 2005

(51) Int. Cl.[7] .............................................. A01K 13/00
(52) U.S. Cl. ............................. 119/753; 4/571.1; 4/659
(58) Field of Search ........................... 119/484, 485, 673, 119/676, 706, 753; 4/548, 571.1, 572.1, 574.1, 4/579, 656, 659; 108/150

(56) References Cited

U.S. PATENT DOCUMENTS

| | | | |
|---|---|---|---|
| 2,547,564 A * | 4/1951 | Burke | 4/572.1 |
| 2,902,976 A | 8/1959 | Wilson | |
| 3,266,464 A | 8/1966 | Davis | |
| 3,615,088 A * | 10/1971 | Compton | 5/607 |
| 3,638,585 A * | 2/1972 | Futrell | 108/9 |
| 4,656,678 A * | 4/1987 | Lipski | 4/578.1 |
| 4,836,144 A | 6/1989 | Cole | |
| 5,367,724 A * | 11/1994 | Coccagna | 4/571.1 |
| 5,488,926 A | 2/1996 | Hunt | |
| 5,513,598 A | 5/1996 | Zapparoli | |
| 5,662,069 A * | 9/1997 | Smith | 119/665 |
| 5,678,511 A | 10/1997 | Day | |
| 5,794,570 A | 8/1998 | Foster et al. | |
| 5,823,121 A * | 10/1998 | Reiter | 108/147.19 |
| 6,122,776 A * | 9/2000 | Cheng | 4/578.1 |
| 6,279,510 B1 * | 8/2001 | Batterton | 119/753 |
| 6,298,501 B1 * | 10/2001 | Beichner | 4/559 |

* cited by examiner

Primary Examiner—Robert P. Swiatek

(57) ABSTRACT

An apparatus, a system and a method for supporting an animal during grooming of the animal. A base has a drain, such as, for example, a drain hole and/or drain holes, which may allow the liquids to flow through the base. The base is supported by, for example, a leg and/or the side walls of a wash tub. The leg pivots from a first position to a second position and/or has a length which adjusts to allow the leg to push against the surface of the wash tub. Moreover, the animal is placed on top of the base and may be groomed by the user while on the base.

23 Claims, 2 Drawing Sheets

APPARATUS, A SYSTEM AND A METHOD FOR SUPPORTING AN ANIMAL DURING GROOMING

BACKGROUND OF THE INVENTION

The present invention generally relates to an apparatus, a system and a method used during grooming of an animal. More specifically, the present invention relates to an apparatus, a system and a method for supporting an animal during grooming. The apparatus may have a base which may be placed on a wash tub. The base may have drainage into the wash tub below. Further, the base may be supported by a leg and a pair of side walls of the wash tub. The leg may have an adjustable length which may allow the leg to push against the wash tub. Moreover, the animal may be placed on top of the base with the leg and/or may be groomed while on the base.

It is generally known that an animal may be washed for grooming and/or hygiene by a user. The animal may be a domestic animal, such as, for example, a dog, a cat, a rabbit and/or the like. The user may be, for example, an owner of the animal, an employee of a pet grooming facility and/or the like. Traditionally, the animal is placed in a wash tub for grooming. The animal may be groomed with liquids in the wash tub, such as, for example, a bath tub. The liquids may be, for example, water, soap and/or a pet shampoo. The liquids may be applied to the animal with, for example, a hose, a faucet, a shower head, a bucket and/or a glove.

When the animal is placed in the wash tub, claws and/or toe nails of the animal may damage interior surfaces of the wash tub by, for example, scratching. Additionally, the animal may attempt to exit the wash tub by, for example, jumping over the sides of the wash tub.

Placing the animal in the wash tub may require lifting the animal over the side walls of the wash tub. A small animal, such as, for example, a kitten, may be groomed in a small wash tub, such as, for example, a kitchen sink. Placing the animal in a kitchen sink may require lifting the animal to a height of the kitchen sink. The lifting of the animal over the sides of the wash tub and/or to the kitchen sink may cause strain to and/or may result in injury to a body of the user. The strain and/or injury to the body of the user may occur in, for example, the lower back, the upper back, the neck, the shoulders, the arms and/or the like. Further, the user may be required to bend over the sides of the wash tub and/or to reach into the wash tub during the grooming of the animal. Moreover, the bending over the sides of the wash tub and/or the reaching into the wash tub during the grooming of the animal may cause strain to and/or may result in injury to the body of the user.

The animal may have hair which may shed during the grooming process. Additionally, the shed hair may enter into plumbing associated with the wash tub. Further, the plumbing may be clogged with the hair and/or may be required to be unclogged by, for example, plumbers' tools, liquid chemicals and/or the like. Moreover, the unclogging of the wash tub may be expensive and/or time consuming.

A need, therefore, exists for an apparatus, a system and a method for supporting an animal during grooming. Additionally, a need exists for an apparatus, a system and a method for supporting an animal during grooming which may prevent the user from having to lift the animal. Further, a need exists for an apparatus, a system and a method for supporting an animal during grooming which may prevent injury to the body of the user. Still further, a need exists for an apparatus, a system and a method for supporting an animal during grooming which provides a leg and a base to support the animal. Moreover, a need exists for an apparatus, a system and a method for supporting an animal during grooming which may prevent the hair from the animal from entering into and/or clogging of plumbing.

SUMMARY OF THE INVENTION

The present invention generally relates to an apparatus used during grooming of an animal. More specifically, the present invention relates to an apparatus, a system and a method for supporting an animal above a surface, such as, for example, a wash tub, while grooming the animal. The apparatus may have a base which is made from a material, such as, for example, cellulose fiber, wood, plastic, polyethylene and/or the like. The base may have a drain, such as, for example, a drain hole and/or drain holes, which may allow liquids to flow into the wash tub. The wash tub may be, for example, a bathtub, a shower, a laundry tub, a sanitary tub, a sink and/or the like. Further, the base may be supported by, for example, a leg or legs and/or side walls of the wash tub. The leg may have a length which adjusts to allow the leg to push against the bottom surface of the wash tube. Moreover, the animal may be placed on the base and/or may be groomed with the liquids while on the base.

To this end, in an embodiment of the present invention, an apparatus for supporting an animal above a surface during grooming of the animal is provided. The apparatus has a base defined by a perimeter having a top side and a bottom side opposite the top side. Further, the apparatus has a opening in the base wherein the opening is located within the perimeter of the base and further wherein the opening extends through the base from the top side to the bottom side. Moreover, the apparatus has a leg associated with the bottom side of the base wherein the leg is defined by a length having a proximal end and a distal end opposite the proximal end wherein the distal end of the leg extends outward with respect to the bottom side of the base and further wherein the leg is adjustable from a first position to a second position contacting the surface.

In an embodiment, the opening is a plurality of holes.

In an embodiment, the apparatus has a fastener attaching the proximal end of the leg to the bottom side of the base.

In an embodiment, the apparatus has a hinge attaching the proximal end of the leg to the bottom side of the base.

In an embodiment, the apparatus has a clamp attaching the proximal end of the leg to the bottom side of the base.

In an embodiment, the apparatus has an arm between the leg and the bottom side of the base wherein the arm holds the leg in the first position and the second position.

In an embodiment, the length of the leg between the proximal end and the distal end is adjustable.

In another embodiment of the present invention, a system for supporting an animal above a basin during grooming of the animal wherein the basin has a bottom encircled by walls is provided. The system has a base defined by a perimeter having a top side and a bottom side opposite the top side wherein the base is placed on the walls of the basin and further wherein the bottom side of the base is adjacent to the walls of the basin. Further, the system has a drainage means in the base for liquids to flow through the base wherein the drainage means extends through the base from the top side to the bottom side of the base. Moreover, the system has a supporting means defined by a length having a first end and a second end opposite the first end wherein the first end is connected to the bottom side of the base wherein the second end of the supporting means extends outward with respect to the bottom side of the base and further wherein the second end of the supporting means is adjacent to the bottom of the basin.

In an embodiment, the top surface of the base declines from the perimeter of the base to the drainage means in the base.

In an embodiment, the system has a fastening means attaching the first end of the supporting means to the bottom side of the base.

In an embodiment, the length of the supporting means between the first end and the second end is adjustable.

In an embodiment, the system has a pivot interposed between the first end of the supporting means and the bottom side of the base wherein the supporting means turns on the pivot.

In an embodiment, the system has an abrasive associated with the top side of the base.

In an embodiment, the system has a screen associated with the top surface of the base wherein the screen covers the drainage means.

In an embodiment, the system has a lip associated with the perimeter of the base.

In an embodiment, the system has an arm interposed between the supporting means and the bottom side of the base.

In another embodiment of the present invention, a method for supporting an animal above a basin during grooming of the animal wherein the basin has a bottom encircle by walls is provided. The method has the step of providing a base defined by a perimeter having a top side and a bottom side opposite the top side. Further, the method has the step of providing an opening in the base wherein the opening extends through the base from the top side to the bottom side of the base. Still further, the method has the step of connecting a leg to the bottom side of the base wherein the leg is defined by a length between a first end and a second end opposite the first end wherein the first end of the leg is adjacent to the bottom side of the base and further wherein the second end extends outward with respect to the bottom side of the base. Moreover, the method has the step of supporting the base wherein the leg is adjacent to the bottom of the basin and further wherein the walls of the base are adjacent to the bottom side of the base.

In an embodiment, the method has the step of adjusting the length of the leg with the second end of the leg wherein the second end of the leg abuts the bottom of the basin.

In an embodiment, the method has the step of pivoting the leg with respect to the base wherein the second end of the leg is adjacent to the bottom side of the base.

In an embodiment, the method has the step of locking the leg at the length wherein the second end of the leg abuts the bottom of the basin.

It is, therefore, an advantage of the present invention is to provide an apparatus, a system and a method for supporting an animal during grooming of the animal.

Another advantage of the present invention is to provide an apparatus, a system and a method for supporting an animal during grooming of the animal which prevents the animal from damaging the wash tub.

And, another advantage of the present invention is to provide an apparatus, a system and a method for supporting an animal during grooming of the animal which provides drainage of a liquid into the wash tub.

Yet another advantage of the present invention is to provide an apparatus, a system and a method for supporting an animal during grooming of the animal which provides holes for drainage of liquids into the wash tub.

A further advantage of the present invention is to provide an apparatus, a system and a method for supporting an animal during grooming of the animal which prevents a liquid to flow outside of the wash tub.

Moreover, an advantage of the present invention is to provide an apparatus, a system and a method for supporting an animal during grooming of the animal which provides a leg to support the base.

And, another advantage of the present invention is to provide an apparatus, a system and a method for supporting an animal during grooming of the animal which provides a surface for the animal to be placed during grooming.

Yet another advantage of the present invention is to provide an apparatus, a system and a method for supporting an animal during grooming of the animal which prevents lifting the animal over the side walls of the wash tub.

Another advantage of the present invention is to provide an apparatus, a system and a method for supporting an animal during grooming of the animal which prevents strain and/or injury to the body of the user.

Yet another advantage of the present invention is to provide an apparatus, a system and a method for supporting an animal during grooming of the animal which prevents hair from the animal from entering the wash tub.

A still further advantage of the present invention is to provide an apparatus, a system and a method for supporting an animal during grooming of the animal which prevents clogging of the wash tub.

Moreover, an advantage of the present invention is to provide an apparatus, a system and a method for supporting an animal during grooming of the animal which provides a screen to separate and/or collect the hair from the animal and a liquid used during the grooming of the animal.

And, another advantage of the present invention is to provide an apparatus, a system and a method for supporting an animal during grooming of the animal which provides a leg which may be adjusted.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to an apparatus, a system and a method for grooming of an animal. More specifically, the present invention relates to an apparatus for supporting an animal during grooming of the animal. The apparatus may have a base which allows the animal to be placed thereon. Further, the apparatus may have a drain for liquids to flow through the base. Still further, the base may be supported by, for example, a leg, a pair of legs, a pair of side walls of the wash tub and/or the like. The leg may have an adjustable length.

Figure 1:
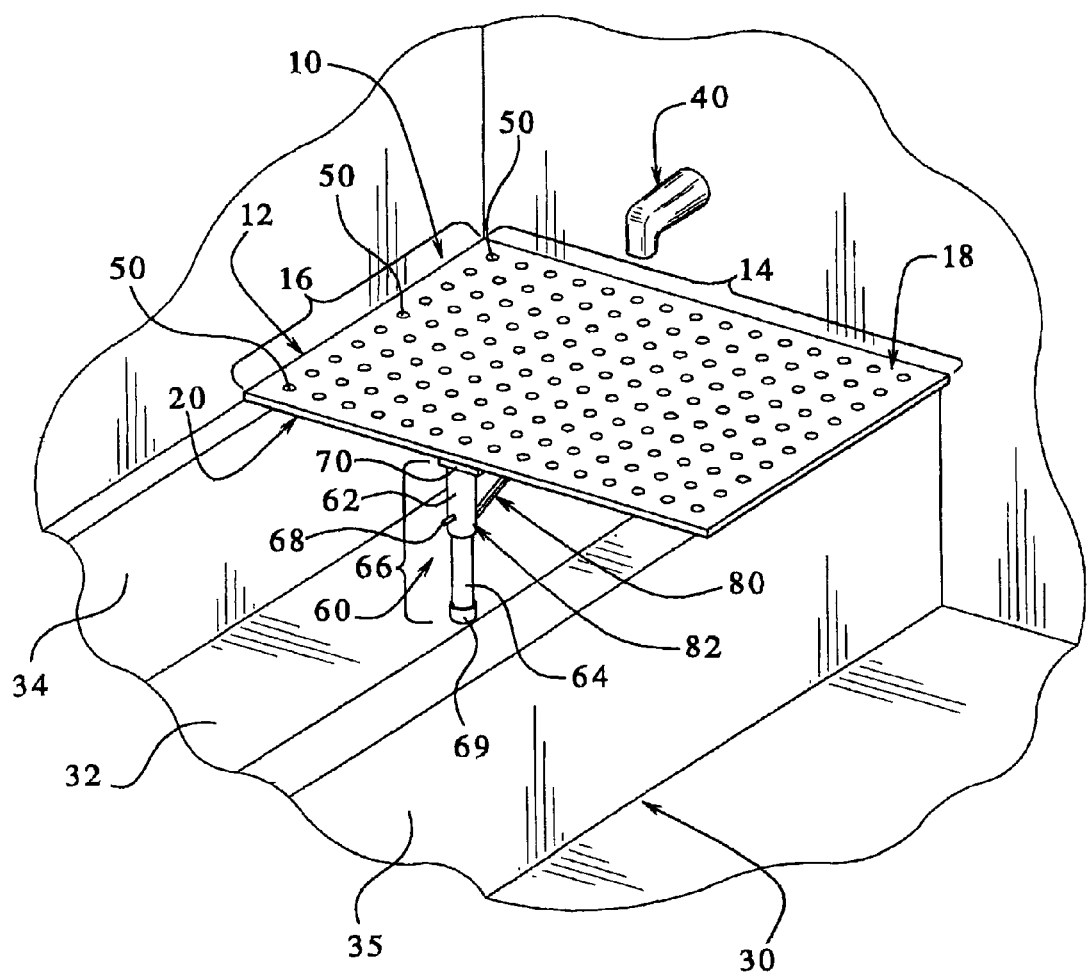
FIG. 1 illustrates a perspective view of an apparatus placed on top of a wash tub in an embodiment of the present invention.

Referring now to the drawings wherein like numerals refer to like parts, FIG. 1 illustrates an apparatus 10 for supporting an animal during grooming of the animal in an embodiment of the present invention. The apparatus 10 may have a base 12 which may be made from a material, such as, for example, cellulose fiber, plywood, plastic, polyethylene, polyurethane and/or the like. The base 12 may have a shape, such as, for example, a square and/or a rectangle. Additionally, the base 12 may have a length 14 and/or a width 16. Further, the base 12 may have a top side 18 and a bottom side 20. The present invention should not be deemed as limited to the embodiments of a specific length, a specific width and/or a specific height. It should be understood that the shape of the base 12 may be any shape, such as, for example, a square, a rectangle, a circle, an oval, a triangle, an eclipse, a hexagon and/or the like.

The base 12 may be implemented with a container, such as, for example, a wash tub. The wash tub may be, for example, a bath tub 30. The bath tub 30 may have a bottom surface 32 which may have a first side wall 34 and/or a second side wall 35. Further, the first side wall 34 and/or the second side wall 35 may have a top surface 36. Still further, the bath tub 30 may be attached to a series of pipes, such as that commonly referred to as plumbing. Moreover, the plumbing may have a water source to the bath tub 30 and/or a drainage outlet from the bath tub 30. The water source may be, for example, a faucet 40, a shower head, a spray hose and/or the like. The drainage outlet may be a drain hole in the bottom surface 32 of the bath tub 30. The present invention should not be deemed as limited to the embodiments of a specific wash tub and/or a specific water source. It should be understood that the wash tub may be any container, such as, for example, the bathtub 30, a laundry tub, a sanitary tub, a sink and/or the like. The container implemented with the base 12 may depend on a size of the animal. For example, the bathtub 30 may be implemented with the base 12 for grooming of a large animal, such as, for example, an adult bulldog. Alternatively, a sink may be implemented with the base 12 for grooming a small animal, such as, for example, a kitten.

As further illustrated in FIG. 1, the base 12 may have drain holes 50 in the form of openings in the base 12 which allow passage of a liquid through the base 12. Further, the configuration of the drain holes 50 in the base 12 may be uniform and/or continuous across the length 14 and/or the width 16 of the base 12. Still further, each of the drain holes 50 may be randomly spaced or may be separated from each other by a uniform distance.

The present invention should not be deemed as limited to the embodiments of a specific configuration of the drain holes 50 in the base 12 and/or a specific distance between each of the drain holes 50. Furthermore, the present invention should not be deemed as limited to the embodiments of a specific number of drain holes 50. It should be understood that the drain holes 50 may have a cross-sectional shape, such as, for example, a square, a triangle, a circle, an oval, a rectangle, a pentagon, an octagon and/or the like.

The drain holes 50 may be formed in the base 12 in a manner that may depend upon the specific material of the base 12. For example, the base 12 made from a lumber material, such as, for example, a peg board and/or a plywood, may require the drain holes 50 to be punched into the base 12. The drain holes 50 may be punched into the base 12 by, for example, a machine press, a punch machine, a die cutter, a manual hole puncher and/or the like. Alternatively, the base 12 made from, for example, a polymer material, such as, for example, a plastic, a polyethylene and/or a polyurethane, may have drain holes molded in the base 12 during manufacture of the base 12. The drain holes 50 may be molded by a molding procedure, such as, for example, injection molding, compression molding and/or the like. Moreover, the present invention should not be deemed as limited to the embodiments of a specific method for forming the drain holes 50 in the base 12. It should be understood that the drain holes 50 may be formed in the base 12 by any method that may be implemented by one with ordinary skill in the art.

A leg 60 may be connected to the bottom side 20 of the base 12. The leg 60 may have a first end 62 and a second end 64 defining a length there between. The leg 60 may have a cross-sectional shape, such as, for example, a square, a triangle, a circle, an oval, a rectangle, a pentagon, an octagon and/or the like. Additionally, the leg 60 may be made from a material, such as, for example, wood, steel, iron, plastic, polyethylene, polyurethane and or the like. A cap 69 may cover the second end 64. The cap 69 may be made from a material, such as, for example, rubber, plastic, polyurethane and/or the like. In an alternate embodiment of the present invention, the base 12, the leg 60 and/or the cap 69 may be integrally formed by, for example, the injection molding of, for example, a plastic, a polyethylene, a polyurethane and/or the like. Moreover, the present invention should not be deemed as limited to the embodiments of a specific cross-sectional shape and/or a specific material for the leg 60 and/or the cap 69.

Preferably, the first end 62 and the second end 64 may be separate parts which form the leg 60. Further, the second end 64 may move in and/or out of the first end 62 of the leg 60. The movement of the second end 64 in and/or out of the first end 62 may allow the length of the leg 60 to be adjusted to a length 66. The adjusted length 66 may, for example, be a length equal to a height of the side walls 34, 35 of the bathtub 30. Still further, the first end 62 may have a lock 68 which may stop the movement of the second end 64 in and/or out of the first end 62 of the leg 60. Moreover, the lock 68 may lock the second end 64 of the leg 60 into a position which corresponds to the length 66 of the leg 60. Moreover, the lock 68 may be, for example, a hole and a pin, a hole and a clip, a threading and/or the like. The lock 68 may be removed from the first end 62 which may allow the second end 64 to move in and/or out of the first end 62.

The base 12 may have a connector 70 which may attach the first end 62 of the leg 60 to the bottom side 20 of the base 12. The connector 70 may be, for example, a clamp, a clip, a hinge, a vise, a nut and/or a bolt, an epoxy, a hook, a snap, a pin, a rivet, a dowel, a U-shaped joint and bolts, a ball and/or a socket, a screw, a bracket, a coupling and/or the like. The connector 70 may allow the leg 60 to pivot at the first end 62. Further, the leg 60 may pivot between a first position and/or a second position. In the first position, the leg 60 may be in contact with and/or may be parallel with the bottom side 20 of the base 12. The second end 64 of the leg 60 may pivot outward with respect to and/or away from the bottom side 20 of the base 12. In the second position, the leg 60 may have pivoted an angular distance from the first position of the leg 60. Alternatively, the leg 60 may be stationary in the second position and/or the connector 70 may prevent the leg 60 from pivoting. The present invention should not be deemed as limited to the embodiments of a specific angular distance between the first position and the second position of the leg 60 and/or a specific connector attaching the first end 62 of the leg 60 to the bottom side 20 of the base 12.

The base 12 may have an arm 80 attached between the bottom side 20 of the base 12 and/or a point on the first end 62 of the leg 60. The arm 80 may move with the leg 60 during pivoting from the first position to the second position.

Further, the arm 80 may lock to hold the leg 60 in the first position and/or the second position. The arm may be, for example, a locking arm for a folding leg of a card table.

Alternatively, the connector 70 may include a locking mechanism, such as, for example, a hinge which may exert forces to hold the leg 60 in the first position and/or the second position. The connector 70 having the locking mechanism may be, for example, a household kitchen cabinet hinge. The present invention should not be deemed as limited to the embodiments of a specific arm connected to the bottom side 20 of the base 12 and the first end 62 of the leg 60 at a specific point. It should be understood that the leg 60 may be held in the first position and/or the second position by any locking mechanism that may be apparent to those skilled in the art.

The top side 18 of the base 12 may have an abrasive which may prevent slippage on the top side 18 and/or may provide traction on the top side 18. The abrasive may be an additive, such as, for example, sand, which may be added to the material of the base 12 during the molding procedure. Alternatively, the abrasive may be, for example, a sticker which may have a top side with an abrasive and a bottom side with an adhesive. Further, the adhesive of the bottom side of the sticker may be adhered to the top side 18 of the base 12. Still further, abrasive of the top side of the sticker may be exposed outwardly with respect to the top side 18 of the base 12. The present invention should not be deemed as limited to the embodiments of a specific abrasive on the top side 18 of the base 12.

As further illustrated by FIG. 1, the base 12 may be placed on the bath tub 30. The bottom side 20 of the base 12 may be placed on the top surface 36 of the side walls 34, 35 of the bath tub 30. Further, the base 12 may be placed at an end of the bath tub 30 closest to the water source, the faucet 40 and/or the drainage outlet. The base 12 may extend from the first side wall 34 across the bottom surface 32 to the second side wall 35. Moreover, the base 12 may be supported above the bottom surface 32 of the bath tub 30 by the first side wall 34 and/or the second side wall 35.

The leg 60 may be moved from the first position to the second position and/or may be locked into the second position. The length 66 of the leg 60 may be adjusted to allow the second end 64 and/or the cap 69 of the leg 60 to press against the bottom surface 32 of the bath tub 30. The lock 68 of the leg 60 may hold the leg 60 at the adjusted length 66. The leg 60 may press against the bottom surface 32 of the bath tub 30 to maintain a force against the bottom side 20 of the base 12. Moreover, the force of the leg 60 against the bottom side 20 may support the base 12 along the length 14 and/or the width 16 of the bottom side 20 of the base 12.

An animal may be placed on the top side 18 of the base 12 for grooming. The animal may be a domestic animal, such as, for example, a dog, a cat, a rabbit and/or the like. The animal may be groomed with liquids, such as, for example, water from the water source and/or the faucet 40 and/or a cleaning solution, such as, for example, a soap, a pet shampoo and/or any other liquid known by one with ordinary skill in the art to groom or otherwise wash an animal. The user may be, for example, an owner of the animal, an employee of a pet grooming facility and/or the like. With the animal placed on the top side 18 of the base 12, the user may turn on the water source and/or the faucet 40 to provide a stream of water. The animal may be placed in the stream of water to wet the hair of the animal. The water may accumulate on the top side 18 of the base 12 and/or may flow through the drain holes 50 into the bathtub 30. Moreover, the water may collect on the bottom surface 32 of the bath tub 30 and/or may flow into the drainage outlet.

The user may turn off the water source and/or the faucet 40 and/or may apply the cleaning solution to the hair of the animal. The user may lather the hair of the animal with the cleaning solution. The user may turn on the water source and/or the faucet 40 to provide the stream of water and/or may rinse off the lather of the cleaning solution from the hair of the animal. Further, the water, the cleaning solution and/or the lather of the cleaning solution may flow from the top side 18 of the base 12, through the drain holes 50 and/or into the drainage outlet as described above. The animal may remain on the top side 18 of the base 12 during grooming or otherwise washing or bathing of the animal. The present invention should not be deemed as limited to the embodiments of a specific animal to be washed, a specific cleaning solution used to wash the hair of the animal and/or a specific water source to provide the stream of water.

Figure 2:
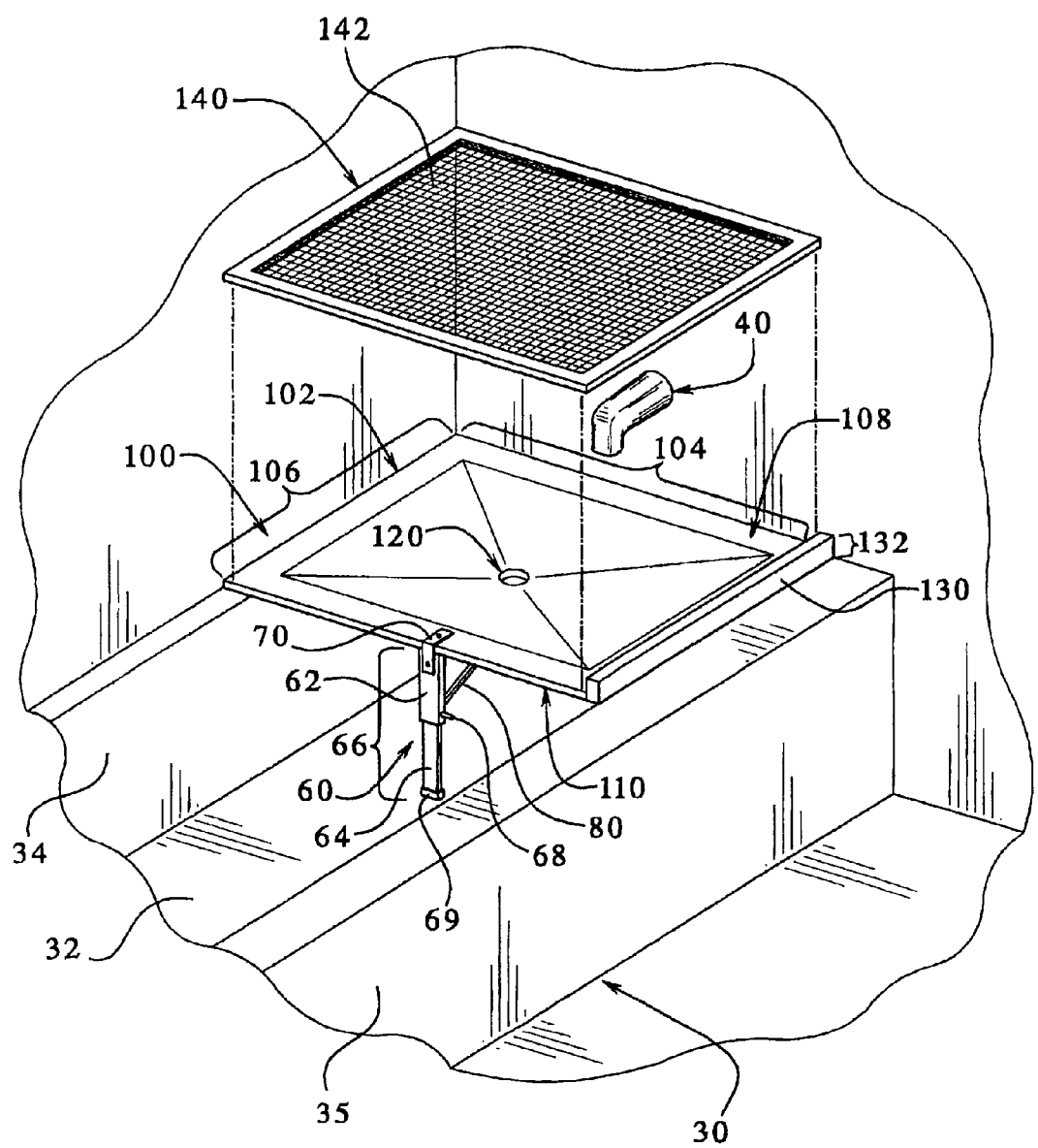
FIG. 2 illustrates a perspective view of an apparatus placed on top of a wash tub in another embodiment of the present invention.

FIG. 2 illustrates a perspective view of an apparatus 100 which may be placed on a wash tub in another embodiment of the present invention. The apparatus 100 may have a base 102 which may be made of a material, such as, for example, cellulose fiber, plywood, plastic, polyethylene, polyurethane and/or the like. Additionally, the base may have a length 104 and a width 106. The base 102 may have a shape, such as, for example, a square, a rectangle and/or the like. Further, the base 102 may have a top side 108 and a bottom side 110. The present invention should not be deemed as limited to the embodiments of a specific length and/or a specific width. It should be understood that the shape of the base 102 may be any shape, such as, for example, a square, a rectangle, a circle, an oval, a triangle, an eclipse, a hexagon and/or the like.

The apparatus 100 may have the leg 60 which has the first end 62, the second end 64, the adjusted length 66, the lock 68 and/or the cap 69. The apparatus 100 may have the connector 70 which may attach the first end 62 of the leg 60 to the bottom side 110 of the base 102. Further, the connector 70 may hold the leg 60 in the first position and/or second position as set forth above for apparatus 10. The apparatus 100 may have the arm 80 attached between the bottom side 110 of the base 102 and/or the point on the first end 62 of the leg 60. Still further, the leg 60 may pivot from the first position to the second position and/or the arm 80 may lock the leg 60 in the first position and/or the second position as set forth above for the apparatus 10.

The base 102 may have a drain 120 which may be an opening in the base 102 which may allow a liquid to flow from the top side 108 of the base 102 into the bathtub 30. The drain 120 may have a cross-sectional shape, such as, for example, a square, a triangle, a circle, an oval, a rectangle, a pentagon, an octagon and/or the like. The drain 120 may be at a location, such as, for example, a center, in the base 102. The top side 108 of the base 102 may be a declining slope towards the drain 120 to increase flow of the water into the drain 120. Further, the drain 120 may be formed in the base 102 with the methods, such as, for example, punching the drain 120 into the base 102 and/or molding the drain 120 in the base 102, as set forth above for the drain holes 50 in the apparatus 10. It should be understood that the drain 120 may be formed in base 102 by any method that may be apparent to one having ordinary skilled in the art. The present invention should not be deemed as limited to the embodiments of a specific location of the drain 120 in the base 102 and/or a specific cross-sectional shape of the drain 120.

The apparatus 100 may have a lip 130 which may be, for example, integrally formed to the base 102. The lip 130 may extend outward with respect to the top side 108 of the base 102. The lip 130 may have a height 132. Further, the lip 130 may have a cross-sectional shape, such as, for example, a circle, a square, a rectangle and/or the like. The lip 130 may be made from a material, such as, for example, wood, aluminum, cellulose fiber, plywood, plastic, polyethylene, polyurethane and/or the like. In an alternate embodiment of the present invention, the base 102, the leg 60, the cap 69 and/or the lip 130 may be integrally formed by, for example, injection molding a plastic, such as, for example, a polyethylene, a polyurethane and/or the like. In another alternate embodiment of the present invention, the lip 130 may be attached to the base 12 of the apparatus 10 as set forth above for the base 102 of the apparatus 100. The present invention should not be deemed as limited to the embodiments of a specific material of the lip 130.

The apparatus 100 may have a screen 140 which may be placed over the top side 108 of the base 102. The screen 140 may be connected to the base 102. The screen 140 may have dimensions which may be equal to the length 104 and the width 106 of the base 102. The screen 140 may be a shape, such as, for example, a rectangle, a square, or any shape of the base 102. Further, the screen 140 may have a surface 142, such as, for example, a meshing, a netting, a webbing and/or the like. The screen 140 may be made from, for example, aluminum, cloth and/or the like. The screen 140 may be attached to the top side 108 of the base 102 by, for example, epoxy, hooks, pins, nails, rivets, tacks, screws and/or the like. In another alternate embodiment of the present invention, the screen 140 may be placed on the top side 18 of the base 12 of the apparatus 10 and/or attached to the base 12 of the apparatus 10 as set forth above for the top side 108 of the base 102 of the apparatus 100.

The animal may be placed on the screen 140 and/or the top side 108 for grooming. The user may turn on the water source and/or the faucet 40 to provide the stream of water to wet the hair of the animal. Further, the lip 130 may prevent any water from splashing, spraying and/or flowing off the base 102 and outside of the bathtub 30. The stream of water may pass through the screen 140, may accumulate on the top side 108 of the base 102, may flow through the drain 120 and into the bathtub 30. The water may collect on the bottom surface 32 of the bath tub 30 and/or may flow into the drainage outlet. Still further, the user may apply the cleaning solution to the hair of the animal, may lather the hair of the animal with the cleaning solution and/or may rinse off the lather of the cleaning solution from the hair of the animal. The water, the cleaning solution and/or the lather from the cleaning solution may flow through the drain 120 and/or into the bathtub 30 as described above. The hair of the animal may shed during the grooming of the animal. The hair may collect on the surface 142 of the screen 140. The user may remove the screen 140 from the base 102 and/or may remove the hair from the surface 142 of the screen 140.

The animal may be placed on the top side of the base for grooming. Further, the animal may be groomed with a liquid which may flow through drain holes and/or a drain to the wash tub. Still further, a leg may be attached to the bottom side of the base which may support the animal during the grooming of the animal. The leg may have a length which may allow the leg to push against the bottom surface of the wash tub.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An apparatus for supporting an animal above a surface during grooming of the animal, the apparatus comprising:
   a rigid base having a plurality of exterior walls defining an outer periphery wherein the rigid base is continuous and planar within the outer periphery and further wherein the rigid base has a top side and a bottom side opposite to the top side;
   an opening in the rigid base wherein the opening is located within the outer periphery of the rigid base and further wherein the opening extends through the rigid base from the top side to the bottom side; and
   only one leg associated with the bottom side of the rigid base wherein the only one leg supports the rigid base at a point on the outer periphery near one of the plurality of exterior walls wherein the only one leg is defined by a length having a proximal end and a distal end wherein the distal end is opposite to the proximal end and further wherein the distal end of the only one leg extends outward with respect to the bottom side of the rigid base and further wherein the only one leg is adjustable from a first position wherein the only one leg is perpendicular to the rigid base to a second position wherein the only one leg is parallel to the rigid base and further wherein the only one leg contacts the surface of the rigid base in the second position.

2. The apparatus of claim 1 wherein the opening includes a plurality of holes.

3. The apparatus of claim 1 further comprising:
   a fastener attaching the proximal end of the only one leg to the bottom side of the rigid base.

4. The apparatus of claim 1 further comprising:
   a bracket attaching the proximal end of the only one leg to the bottom side of the rigid base.

5. The apparatus of claim 1 further comprising:
   a screen covering the opening of the rigid base.

6. The apparatus of claim 1 further comprising;
   an arm between the only one leg and the bottom side of the rigid base wherein the arm holds the only one leg in the first position wherein the only one leg is perpendicular to the rigid base and wherein the arm holds the only one leg in the second position wherein the only one leg is parallel to the rigid base and further wherein the only one leg contacts the supporting surface of the rigid base in the second position.

7. The apparatus of claim 1 wherein the length of the only one leg between the proximal end and the distal end is adjustable.

8. The apparatus of claim 1 further comprising:
   a lip associated with the outer periphery of the rigid base.

9. A system for supporting an animal during grooming of the animal, the system comprising:
   a basin having an interior defined by a bottom wherein the bottom and the interior are encircled by walls forming the interior of the basin;
   a base defined by a perimeter having a top side and a bottom side opposite to the top side wherein the base is placed on the walls of the basin and further wherein the bottom side of the base is adjacent to the walls of the basin;

a drainage means in the base for a liquid to flow through the base wherein the drainage means extends through the base from the top side to the bottom side of the base; and a supporting means defined by a length having a first end and a second end opposite to the first end wherein the first end is connected to the bottom side of the base and further wherein the second end of the supporting means extends outward with respect to the bottom side of the base wherein the second end of the supporting means extends into the interior of the basin.

10. The system of claim 9 wherein the top surface of the base declines with respect to the perimeter of the base.

11. The system of claim 9 further comprising:
a fastening means attaching the first end of the supporting means to the bottom side of the base.

12. The system of claim 9 wherein the length of the supporting means between the first end and the second end is adjustable.

13. The system of claim 9 further comprising:
a pivot interposed between the first end of the supporting means and the bottom side of the base wherein the supporting means turns at the pivot.

14. The system of claim 9 further comprising:
a screen associated with the top surface of the base wherein the screen covers the drainage means.

15. The system of claim 9 further comprising:
a lip associated with the perimeter of the base.

16. The system of claim 9 further comprising:
an arm interposed between the supporting means and the bottom side of the base.

17. A method for supporting an animal above a basin during grooming of the animal wherein the basin has
an interior and a bottom wherein the interior and the bottom are encircled by walls, the method comprising the steps of:
providing a base defined by a perimeter having a top side and a bottom side opposite to the top side;
providing an opening in the base wherein the opening extends through the base from the top side to the bottom side of the base;
connecting a leg to the bottom side of the base wherein the leg is defined by a length between a first end and a second end opposite to the first end wherein the first end of the leg is attached to the bottom side of the base and further wherein the second end extends outward with respect to the bottom side of the base;
providing an arm between the base and the leg wherein the arm has a length defined between a first end and a second end wherein the second end is opposite to the first end and further wherein the first end of the arm is attached to the base and further wherein the second end of the arm is attached to the leg;
supporting the base with the leg wherein the leg extends into the interior of the basin and is between the bottom of the basin and the bottom side of the base and further wherein the walls of the basin abut the bottom side of the base; and
supporting the animal on the base.

18. The method of claim 17 further comprising the step of:
adjusting the length of the leg with the second end of the leg wherein the second end of the leg abuts the bottom of the basin.

19. The method of claim 17 further comprising the step of:
pivoting the leg with respect to the base wherein the second end of the leg is adjacent to the bottom side of the base.

20. The method of claim 17 further comprising the step of:
locking the second end of the leg to the first end of the leg wherein the second end of the leg abuts the bottom of the basin.

21. An apparatus for supporting an animal above a basin during grooming of the animal, the apparatus comprising:
a planar surface defined by a peripheral edge wherein the planar surface has a top side and a bottom side opposite to the top side;
an opening in the planar surface wherein the opening is located within the perimeter of the planar surface and further wherein the opening extends through the planar surface from the top side to the bottom side; and
only one leg associated with the bottom side of the planar surface at the peripheral edge of the planar surface wherein the only one leg is defined by a length having a proximal end and a distal end opposite to the proximal end wherein the distal end of the only one leg extends outward with respect to the bottom side of the planar surface and further wherein the only one leg is adjustable from a first position to a second position wherein the only one leg contacts the basin in the second position.

22. A system for supporting an animal above a basin during grooming of the animal wherein the basin has a bottom encircled by walls, the system comprising:
a base defined by a perimeter having a top side and a bottom side opposite to the top side wherein the base is placed on the walls of the basin and further wherein the bottom side of the base is adjacent to the walls of the basin;
a drainage means in the base for a liquid to flow through the base wherein the drainage means extends through the base from the top side to the bottom side of the base; and
only one leg defined by a length having a first end and a second end opposite to the first end wherein the first end is connected to the bottom side of the base and further wherein the second end of the supporting means extends outward with respect to the bottom side of the base and further wherein the second end of the supporting means is adjacent to the bottom of the basin.

23. A method for supporting an animal above a basin during grooming of the animal wherein the basin has an interior and a bottom wherein the interior and the bottom are encircled by walls, the method comprising the steps of:
providing a base defined by a perimeter having a top side and a bottom side opposite to the top side;
providing an opening in the base wherein the opening extends through the base from the top side to the bottom side of the base;
connecting a leg to the bottom side of the base wherein the leg is defined by a length between a first end and a second end opposite to the first end wherein the first end of the leg is attached to the bottom side of the base and further wherein the second end extends outward with respect to the bottom side of the base;
supporting the base with the leg wherein the leg extends into the interior of the basin and is between the bottom of the basin and the bottom side of the base and further wherein the walls of the basin abut the bottom side of the base; and
pivoting the leg with respect to the base wherein the second end of the leg is adjacent to the bottom side of the base.

* * * * *